United States Patent
Kamara et al.

(10) Patent No.: US 10,985,902 B2
(45) Date of Patent: *Apr. 20, 2021

(54) DYNAMIC SYMMETRIC SEARCHABLE ENCRYPTION

(71) Applicant: Microsoft Technology Licensing, LLC, Redmond, WA (US)

(72) Inventors: Seny Fakaba Kamara, Seattle, WA (US); Charalampos Papamanthou, Berkley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

This patent is subject to a terminal disclaimer.

(21) Appl. No.: 14/561,455

(22) Filed: Dec. 5, 2014

(65) Prior Publication Data

US 2015/0156011 A1      Jun. 4, 2015

Related U.S. Application Data

(63) Continuation of application No. 13/210,398, filed on Aug. 16, 2011, now Pat. No. 8,930,691.

(51) Int. Cl.
*H04L 9/00* (2006.01)
*G06F 21/62* (2013.01)

(52) U.S. Cl.
CPC ............ *H04L 9/00* (2013.01); *G06F 21/6218* (2013.01)

(58) Field of Classification Search
CPC ..... G06F 21/6218; G06F 21/6209; G06F 9/00

USPC ........................................................ 713/165
See application file for complete search history.

(56) References Cited

U.S. PATENT DOCUMENTS

| | | | |
|---|---|---|---|
| 8,281,125 B1* | 10/2012 | Briceno | H04L 63/0428 707/741 |
| 2007/0112795 A1* | 5/2007 | Travison, Jr. | G06F 17/30327 |
| 2007/0219965 A1* | 9/2007 | Sato | G06F 17/30864 |
| 2007/0277005 A1* | 11/2007 | So | G06F 12/0815 711/154 |
| 2009/0300351 A1* | 12/2009 | Lei | G06F 17/30864 713/165 |
| 2010/0318782 A1 | 12/2010 | Auradkar et al. | |
| 2013/0046974 A1 | 2/2013 | Kamara et al. | |

OTHER PUBLICATIONS

Park, et al., "Searchable Keyword-Based Encryption", Retrieved at <<http://eprint.iacr.org/2005/367.pdf>>, 2005, Pages 1-13.

(Continued)

*Primary Examiner* — Teshome Hailu
(74) *Attorney, Agent, or Firm* — Medley, Behrens & Lewis, LLC

(57) ABSTRACT

Described herein is an efficient, dynamic Symmetric Searchable Encryption (SSE) scheme. A client computing device includes a plurality of files and a dictionary of keywords. An index is generated that indicates, for each keyword and each file, whether a file includes a respective keyword. The index is encrypted and transmitted (with encryptions of the files) to a remote repository. The index is dynamically updateable at the remote repository, and can be utilized to search for files that include keywords in the dictionary without providing the remote repository with information that identifies content of the file or the keyword.

20 Claims, 8 Drawing Sheets

(56) References Cited

OTHER PUBLICATIONS

Sedghi, et al., "Adaptively Secure Computationally Efficient Searchable Symmetric Encryption", Retrieved at <<http://eprints.eemcs.utwente.nl/15312/01/ESORICS09.pdf>>, 2009, pp. 1-17.
Waters, et al., "Building an Encrypted and Searchable Audit Log", Retrieved at <<http://arnetminer.org/dev.do?m=downloadpdf&url=http://arnetminer.org/pdf/PDFFiles/--d---d-1238034274727/Building an Encrypted and Searchable Audit Log1238036757046.pdf>>, In the Proceedings of 11th Annual Network and Distributed System Security Symposium, 2002, pp. 1-11.
Chase, et al., "Structured Encryption and Controlled Disclosure", Retrieved at <<http://eprint.iacr.org/2011/010.pdf>>, Dec. 2010, pp. 1-25.
Boldyreva, et al, "Order-Preserving Symmetric Encryption", Retrieved at <<http://www.google.co.in/url?sa=t&source=web&cd=7&ved=0CEsQFjAG&url=http%3A%2F%2Fwww.springerlink.com%2Findex%2Fy37n442u95067h23.pdf&ei=NRqcTb6HKs2BhQfghfneBg&usg=AFQjCNHW7znl91kRH3c9qJ0RLKyxkNzFng>>, In theProceedings of the 28th Annual International Conference on Advances in Cryptology: the Theory and Applications of Cryptographic Techniques, 2009, pp. 1-24.
Yongfeng, et al., "Encrypted Storage and Retrieval in Cloud Storage Applications", Retrieved at <<http://wwwen.zte.com.cn/endata/magazine/ztecommunications/2010Year/no4/articles/201012/t20101220_197082.html>>, Dec. 20, 2010, pp. 1-3.
"Office Action dated Feb. 4, 2014", U.S. Appl. No. 13/210,398, 19 pages.
"Reply to Office Action dated Feb. 4, 2014", filed Aug. 4, 2014, U.S. Appl. No. 13/210,398, 16 pages.

\* cited by examiner

DYNAMIC SYMMETRIC SEARCHABLE ENCRYPTION

RELATED APPLICATION

This application is a continuation of U.S. patent application Ser. No. 13/210,398, filed on Aug. 16, 2011, and entitled "DYNAMIC SYMMETRIC SEARCHABLE ENCRYPTION", the entirety of which is incorporated herein by reference.

BACKGROUND

Many users store various types of documents in a remote repository (commonly known as "cloud storage"), administered by an external entity. As the term is generally used herein, a document can correspond to any unit of information, such as a text-bearing document (such as email), a music file, a picture, a financial record, and so on. A user may opt to store documents in the remote repository for various reasons, e.g., based on factors pertaining to convenience, accessibility, storage capacity, reliability, etc.

Contractual obligations may require the entity which administers the remote repository to minimize the risk of unauthorized access to a user's documents. However, from a technical perspective, there may be little which prevents the entity itself from accessing and examining personal documents of a user. This may understandably unsettle a user. For instance, the user's documents may contain sensitive information that the user does not wish to divulge to any person, including the entity which administers the remote repository.

A user may address this concern by encrypting the documents and storing the documents in encrypted form at the remote repository. This approach effectively prevents the entity which administers the remote repository (or anyone else) from examining the documents. However, this approach also prevents the user from performing any meaningful operations on the documents that are stored in the remote repository. For instance, the encryption of the documents precludes the user from performing an on-line search of the documents. The user may address this situation by downloading all the documents and decrypting them. But this solution runs counter to the user's initial motivation for storing the documents in the remote repository.

The cryptographic community has developed technology that is referred to herein as Symmetric Searchable Encryption (SSE), which utilizes symmetric key encryption to generate an encrypted index that can be employed in connection with keyword searches. That is, a user can set forth a keyword, and the encrypted index can be analyzed to locate documents that include such keyword, wherein the entity that administers the remote repository that retains the encrypted files and index remains unaware of which files include which keywords. At least some SSE schemes require linear time search, where each indexed document is analyzed to ascertain whether the respective document includes a keyword. This approach may be prohibitively inefficient, particularly for relatively large document collections. Other existing SSE schemes allow for sublinear search; however, these schemes are inefficient with respect to updating an index that is employed when a document collection is searched. This can be problematic for data collections where documents frequently change, such as emails.

SUMMARY

The following is a brief summary of subject matter that is described in greater detail herein. This summary is not intended to be limiting as to the scope of the claims.

Various technologies pertaining to an efficient and dynamic Symmetric Searchable Encryption (SSE) scheme are described herein. This scheme may be particularly advantageous with respect to relative large document (file) collections that are subject to frequent updates. Exemplary file collections include email collections, image collections (where metadata is applied to the images), word processing document collections, amongst other collections of files that include at least some text. The scheme is employed to generate an encrypted index that is retained on a remote repository together with encrypted files. The encrypted index can be searched without the administrator of the remote repository learning which files include which keywords, and also without the administrator of the remote repository learning the identity of the keyword set forth by a searcher.

The encrypted index can be generated by first generating an unencrypted index at the client computing device, wherein the unencrypted index identifies which files include a predefined set of keywords (a dictionary). The unencrypted index is in the form of a tree structure, where leaf nodes of the trees are pointers to the files in the file collection. In an example, the tree can be a red-black tree, where each node has two immediate child nodes. Vectors are assigned to nodes, where a vector assigned to a node includes a series of values that correspond to keywords in the dictionary. A value in the vector indicates whether a file that is pointed to by a leaf node hierarchically at or beneath the node includes a keyword that corresponds to the vector.

This index is then encrypted to generate an encrypted index. The files themselves can be encrypted through utilization of any suitable symmetric encryption scheme, as the file encryption is not dependent upon the scheme employed to encrypt the index. Encryption of the index is undertaken by utilizing a probabilistic algorithm to generate a secret key, which is based upon a security parameter (which may define a length of the secret key in bits). Another probabilistic algorithm can be employed to generate an encrypted index and a sequence of ciphertexts, wherein the probabilistic algorithm outputs the encrypted index and the sequence of ciphertexts as a function of the secret key, the unencrypted index, and the files (in a sequence). The encrypted index and the sequence of ciphertexts can be retained at the remote repository.

When the user wishes to perform a keyword search over files in the remote repository, the user sets forth a keyword, and a (possibly probabilistic) algorithm can output a search token based upon the keyword and the secret key described above. The search token is transmitted to the remote repository, which can locate one or more ciphertexts. The located ciphertexts correspond to files that include the keyword. Located ciphertexts are returned to the client computing device employed by the user, and the ciphertexts are decrypted to generate the files that include the keyword.

The encrypted index can be updated relatively efficiently to reflect changes in the file collection (additions or removals of files). That is, the unencrypted index need not be regenerated from scratch, and the ciphertexts need not be re-transmitted to the remote repository. To update the encrypted index to include a representation of a file that has been added to the file collection, a (possibly probabilistic) algorithm can generate an add token, wherein the add token is output based upon the secret key and the file that is added to the document collection. At the remote repository, the add token, the encrypted index, and the ciphertext is provided to a deterministic algorithm, which outputs an updated encrypted index and an updated sequence of ciphertexts. The ciphertext and encrypted index can be updated in a similar fashion when a file is deleted from the file collections. In any event, the encrypted index and ciphertext is dynamically updated without requiring the unencrypted index to be entirely regenerated and without requiring the sequence of ciphertexts to be regenerated and retransmitted from the client computing device to the remote repository.

Other aspects will be appreciated upon reading and understanding the attached figures and description.

DETAILED DESCRIPTION

Figure 1:
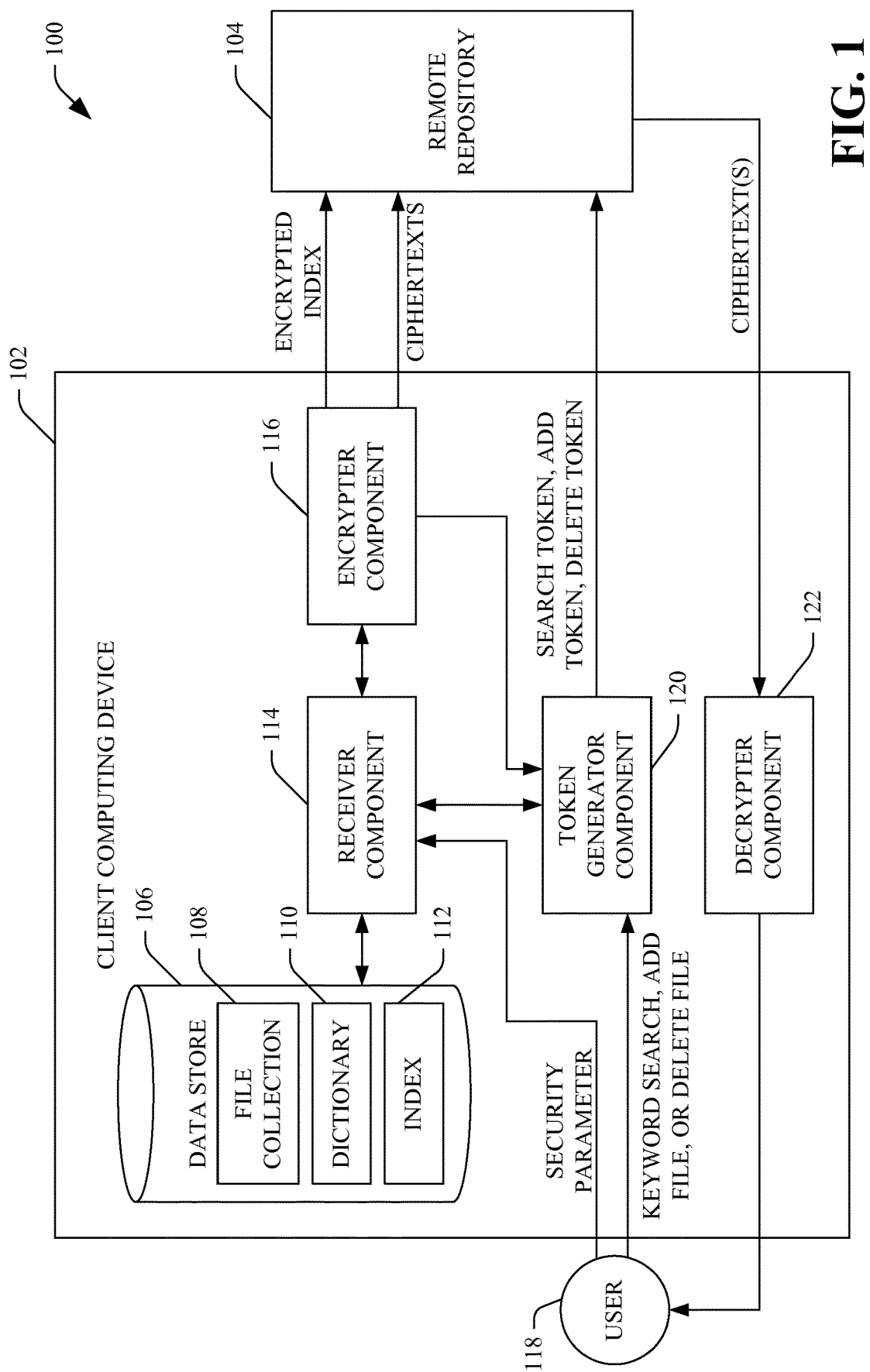
FIG. 1 is a functional block diagram of an exemplary system that facilitates generating an encrypted index that can be employed at a remote repository to search for content in encrypted files.

Various technologies pertaining to a dynamic efficient Symmetric Searchable Encryption (SSE) scheme will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference to FIG. 1, an exemplary system 100 that facilitates generating and updating an encrypted index that can be employed to locate files that include one or more queried keywords is illustrated. The system 100 comprises a client computing device 102, which can be any suitable computing device, including but not limited to a desktop computing device, a laptop computing device, a tablet computing device, a mobile telephone, or any other suitable computing device. The system 100 further comprises a remote repository 104, which is accessible to the client computing device 102 by way of a suitable network connection, including but not limited to an Internet connection, a cellular telephone connection, an intranet connection, or other suitable connection. A user of the client computing device, for instance, may desirably store a file collection on the remote repository 104 (such that storage space is not consumed on the client computing device 102). As mentioned above, however, the user of the client computing device 102 may wish to prohibit an administrator of the remote repository 104 from accessing the files "in the clear." Accordingly, a user of the client computing device 102 desirably encrypts files that are to be retained in the remote repository 104, but further wishes to have the ability to perform operation on the encrypted files, such as search for files that include specified keywords.

The client computing device 102 comprises a data store 106, wherein the data store 106 may be any suitable computer-readable medium, including but not limited to memory, a removable disk, a flash drive, a hard drive, etc. The data store 106 comprises a file collection 108, wherein files in the file collection 108 are desirably encrypted and retained on the remote repository 104. For instance, the file collection 108 can be a collection of emails, images (with metadata assigned thereto that describes content of the images), videos (with metadata assigned thereto), web pages, word processing documents, spreadsheet documents, slideshow presentation documents, or any other suitable type of document that includes text.

The data store 106 further comprises a dictionary 110, which includes a plurality of predefined keywords that may be searched for by a user of the client computing device 102. The dictionary 110, for instance, may include an entirety of the English dictionary, a subset of words that are most commonly searched, a subset of words that are probabilistically determined to be most frequently the subject of a search, words that are most common in the English language, etc. The user, when performing a search, may be restricted to retrieving documents that include at least one of the keywords in the dictionary 110.

The data store 106 additionally comprises an index 112 that indicates which files in the file collection 108 include which keywords in the dictionary 110. In an exemplary embodiment, the index 112 can be a data structure that is in the form of a tree, wherein the tree comprises a plurality of layers of nodes, and wherein leaf nodes of the tree are pointers to files in the file collection 108. Vectors are assigned to nodes, wherein a number of entries of a vector corresponds to (is equal to) a number of keywords in the dictionary 110. An entry at a certain location in a vector that is assigned to a particular node is indicative of whether or not a file in the file collection 108 with a pointer represented by a leaf node beneath the particular node includes a keyword represented by the entry of the vector at the certain location. Pursuant to an example, the tree can be a red-black (binary) tree, wherein each node in the tree has two immediate children. In another exemplary embodiment, the tree can be a tertiary tree. In still yet another exemplary embodiment, the tree can be a "fat" tree, wherein the tree has two levels where the degree of internal nodes is $O(\sqrt{n})$. In such an approach, encrypted Bloom filters of distinct keywords can be stored at leaves of the tree. Other tree structures are also contemplated, and are intended to fall under the scope of the hereto-appended claims.

The client computing device 102 further comprises a receiver component 114 that receives the file collection 108, the dictionary 110, and the index 112. An encrypter component 116 is in communication with the receiver component 112, and outputs an encrypted index and a sequence of ciphertexts. The encrypted index corresponds to the index 112 (the encrypted index will also be a tree structure with an equivalent number of nodes and hierarchy), and the sequence of ciphertexts corresponds to a sequence of files in the file collection 108. The encrypter component 116 generates the encrypted index and the sequence of ciphertexts based at least in part upon a sequence of files in the file collection 108, the index 112, and a secret key. The secret key can be generated at random and based at least in part upon a security parameter, which can define a length of the secret key (e.g., 128 bits, 192 bits, 256 bits, . . . ). The client computing device 102 then transmits the encrypted index and the sequence of ciphertexts to the remote repository 104, and can optionally delete the file collection 108 from the data store 106.

Subsequently, the user 118 may wish to perform a search for files from the file collection 108 that comprise at least one keyword included in the dictionary 110, wherein such files are encrypted as ciphertext on the remote repository 104. Additionally, the user 118 may wish to add a file to the file collection 108 and/or delete a file from the file collection 108. Accordingly, the user 118 can issue a query that includes the keyword, generate a new file to be included in the file collection 108, or delete an existing file from the file collection.

In a first example, the user may wish to perform a search over files in the file collection 108 (retained as ciphertexts on the remote repository 104) using a particular keyword. A token generator component 120 receives the keyword, and additionally receives the secret key generated by the encrypter component 116 (which can be based on a password set forth by the user 118). The token generator component 120 then generates a search token based upon the keyword and the secret key, and transmits the search token to the remote repository 104. The search token can include data that indicates to the remote repository 104 how to analyze the encrypted index to locate appropriate ciphertexts. The client computing device 102 further comprises a decrypter component 122 that receives at least one ciphertext that is retrieved by the remote repository 104 responsive to receipt of the search token. The decrypter component 122 can decrypt the received ciphertext using the secret key that was employed by the encrypter component 116 to generate the ciphertext. This results in output of an unencrypted file (a file in the file collection 108) to the user 118, wherein the unencrypted file includes the keyword set forth by the user 118. From the perspective of the user 118, the user 118 has submitted at least one keyword and has been provided with files that include such keyword. The remote repository 104 has performed the search, but is unaware of any content of files that were retrieved during the search and is further unaware of the keyword utilized to perform the search.

In a second example, the user may wish to add a file to the file collection 108. The token generator component 120 can be in communication with the receiver component 114, and receives the secret key and the file, as well as the index 112 from the receiver component 114, and outputs an "add token" to the remote repository 104 that is generated based at least in part upon the secret key, the file desirably added, and the index 112. The add token can include an update to the encrypted index, which may comprise a subtree that is a portion of the encrypted index. The remote repository 104 can then update the sequence of ciphertexts and the encrypted index based upon the add token, and can allow the added file to be retrieved when the user 118 performs a search using a keyword that is included in the added file without requiring the client computing device 102 to regenerate (and re-encrypt) the entirety of the index 112, without requiring downloading of all of the ciphertext from the remote repository 104, etc.

In a third example, the user may wish to delete a file from the file collection 108. For instance, the user 118 can retrieve ciphertext corresponding to the desirably deleted file from the remote repository 104, and can decrypt such file using the secret key. The token generator component 120 receives the secret key, the file, and the index 112, and outputs a "delete token" to the remote repository 104. The delete token comprises an update to the encrypted index, which is a subtree of the tree of the encrypted index. The remote repository 104 can then update the sequence of ciphertexts and the encrypted index based upon the delete token. If the user 118 subsequently performs a search using a keyword in the dictionary 110 that was included in the deleted file, such file will not be returned to the user. Accordingly, again, the encrypted index can be updated at the remote repository 104 without requiring the client computing device 102 to re-encrypt each of the files in the file collection 108, without requiring the client computing device 102 to entirely re-generate the index 112, and without requiring the client computing device 102 to entirely re-encrypt the index 112.

Figure 2:
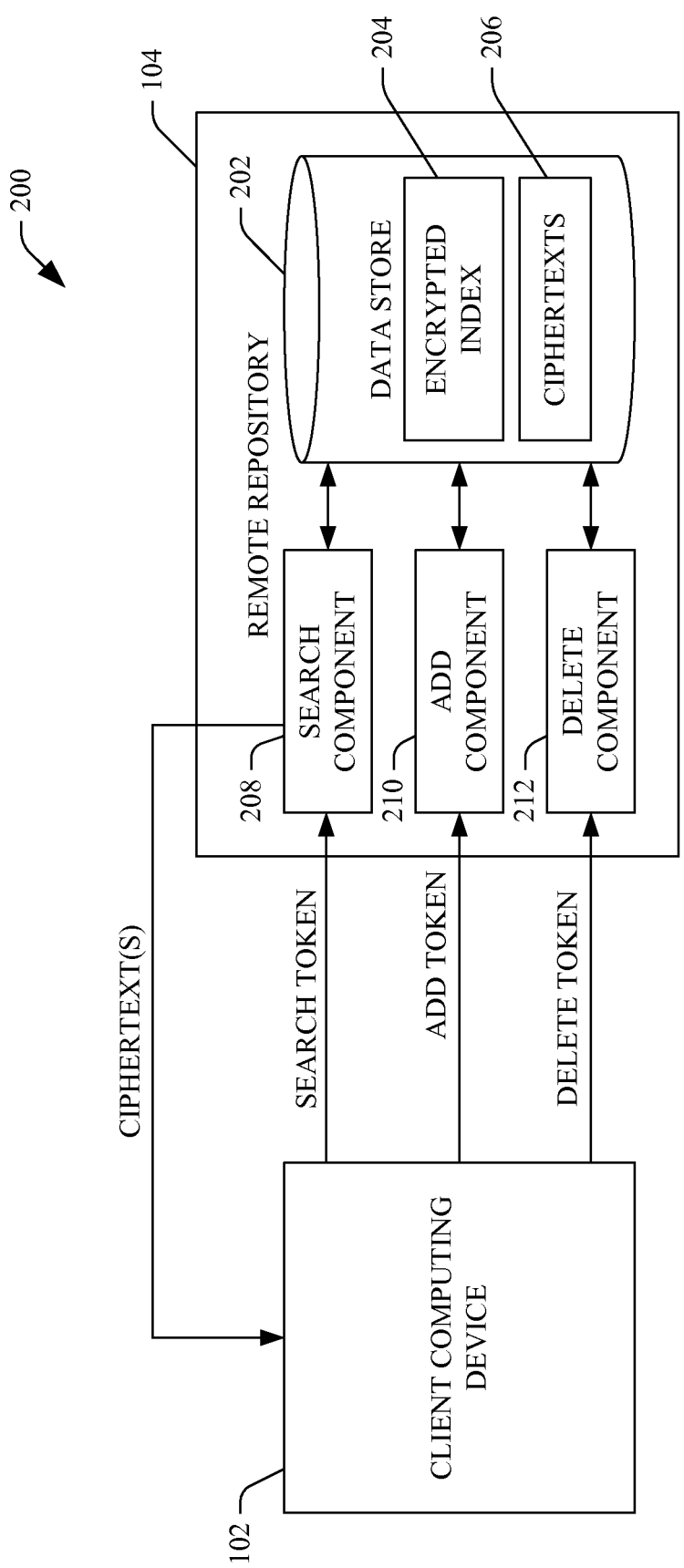
FIG. 2 is a functional block diagram of an exemplary system that facilitates searching over encrypted files and updating an encrypted index.

Now referring to FIG. 2, an exemplary system 200 that facilitates efficiently searching over encrypted documents and updating an encrypted index is illustrated. The system 200 comprises the client computing device 102 in communication with the remote repository 104. The remote repository 104 comprises a data store 202 that includes an encrypted index 204 and ciphertexts 206 (generated by the encrypter component 116). The encrypted index 204 is an encryption of the index 112 generated at the client computing device 102.

The remote repository 104 further comprises a search component 208 that receives a search token from the client computing device 102. The search component 208 accesses the encrypted index 204 responsive to receipt of the search token, and retrieves at least one ciphertext based at least in part upon the search token. As described above, the search token corresponds to a keyword, wherein files that include the keyword are desirably located. The at least one ciphertext retrieved by the search component 208 is an encryption of a file that includes the keyword, and such ciphertext is transmitted to the client computing device 102 by way of a suitable network connection The remote repository 104 further comprises an add component 210 that receives an add token from the client computing device 102, and updates the encrypted index 204 and the ciphertexts 206 responsive to receipt of the add token. Updating of the encrypted index 204 and the ciphertexts 206 responsive to receipt of the add token allows for a ciphertext that is an encryption of a particular file to be retrieved by the search component 208 responsive to the search component 208 receiving a search token that corresponds to a keyword in the dictionary 110 from the client computing device 102. As described above, the add token is generated at the client computing device responsive to the user 118 adding a file to the file collection 108.

The remote repository 104 also comprises a delete component 212 that receives a delete token from the client computing device 102 and updates the encrypted index 204 and the ciphertexts 206 responsive to receipt of the delete token. Updating of the encrypted index 204 and the ciphertexts 206 responsive to receipt of the delete token allows for a search performed by the search component 208 to fail to retrieve the ciphertext corresponding to the deleted file even if the deleted file includes a keyword corresponding to a search token. It can thus be ascertained that the encrypted index 204 and the ciphertexts 206 can be dynamically updated at the remote repository 104 without requiring the client computing device 102 to regenerate the index 112 and/or re-encrypt the index 112.

Figure 3:
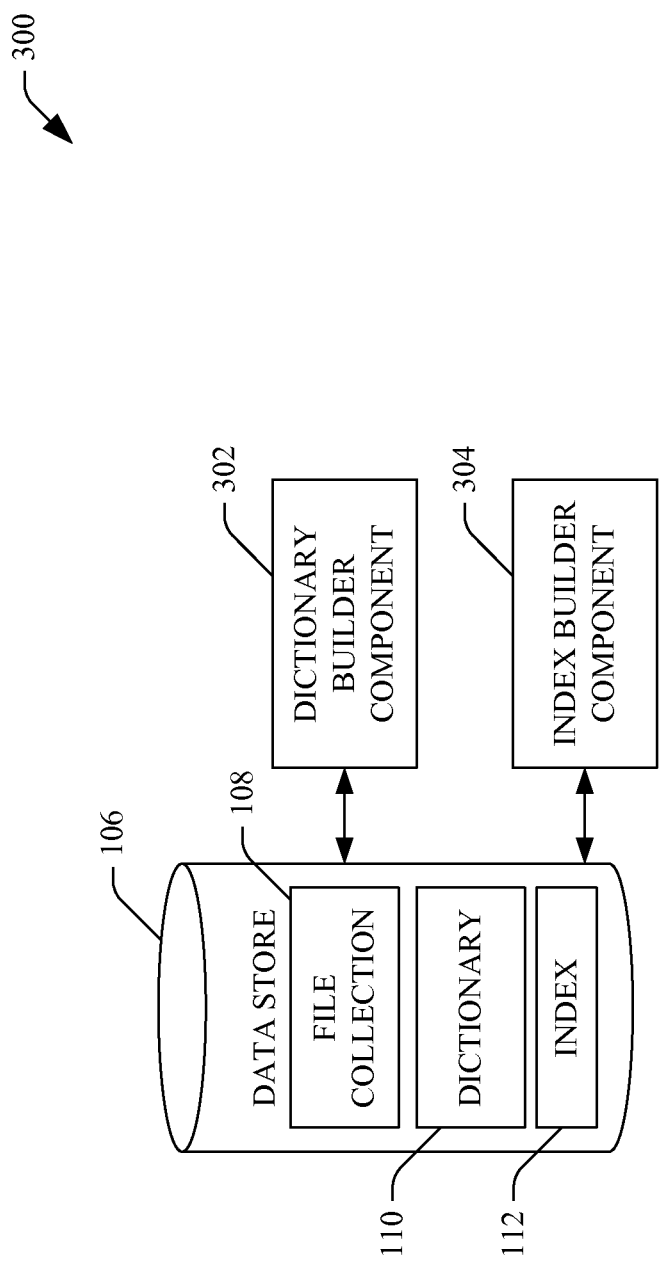
FIG. 3 is a functional block diagram of an exemplary system that facilitates building a dictionary of keywords.

Referring now to FIG. 3, an exemplary system 300 that facilitates building the dictionary 110 and the index 112 is illustrated. The system 300 resides on the client computing device 102 and comprises the data store 106, which includes the file collection 108. A dictionary builder component 302 accesses the file collection 108 and outputs the dictionary 110 based at least in part upon content of the file collection 108. For instance, the dictionary builder component 302 can select some threshold number of most frequently used words in the file collection 108 (excluding common words such as "the", "a", "an", "and", etc.), and such keywords can be collectively stored as the dictionary 110. In another exemplary embodiment, the dictionary builder component 302 can build the dictionary 110 based upon most frequently queried keywords across multiple users. In yet another exemplary embodiment, the dictionary builder component 302 can build the dictionary based upon content of search engine query logs. In still yet another exemplary embodiment, the dictionary 110 can be manually constructed by a user or group of users.

The system 300 further comprises an index builder component 304 that builds the index 112 ($\delta$). The index builder component 304 receives the file collection 108 (a sequence of n files $f=(f_1, \ldots f_n)$), wherein an order is assumed on such files. The order can be imposed by an order of unique identifiers assigned to the files: $id(f_1), \ldots, id(f_n)$. The dictionary 110 can be built, and can be implemented with a red-black tree T on top of the identifiers. The leaves of the tree are pointers to the respective files, which may be stored on disk. The index builder component 304, at each internal node u of the tree, can store an m-bit vector $data_u$, where m is a number of keywords in the dictionary 110. The ith bit of $data_u$ accounts for keyword $w_i$, for $i=1, \ldots m$. Specifically, if $data_u[i]=1$, then there is at least one path from u to some leaf storing $id(f)$, such that f includes the keyword $w_i$. The index builder component 304 can guarantee the aforementioned property by computing $data_u$ as follows: for every leaf l storing $id(f)$, $data_l[i]=1$ if an only if the file f includes the keyword $w_i$. For an internal node u of the tree T, (a node other than a leaf), with left child v and right child z., the index builder component 304 can compute $data_u$ of the as follows:

$$data_u = data_v + data_z, \quad (1)$$

where + denotes the bitwise Boolean OR operation. It can be ascertained that the index 112 generated by the index builder component 304 can allow for both keyword-based operations (by following paths from the root to the leaves) and file-based operations (by following paths from the leaves to the root).

Further, the space complexity of the index 112 can be O (mn), and constructing the index 112 can take time O (mn). The search time for a keyword w using the index 112 can be $O(|f_w| \log n)$, where $|f_w|$ is the number of files containing w. The time to update the index 112 can be O (m log n).

Figure 4:
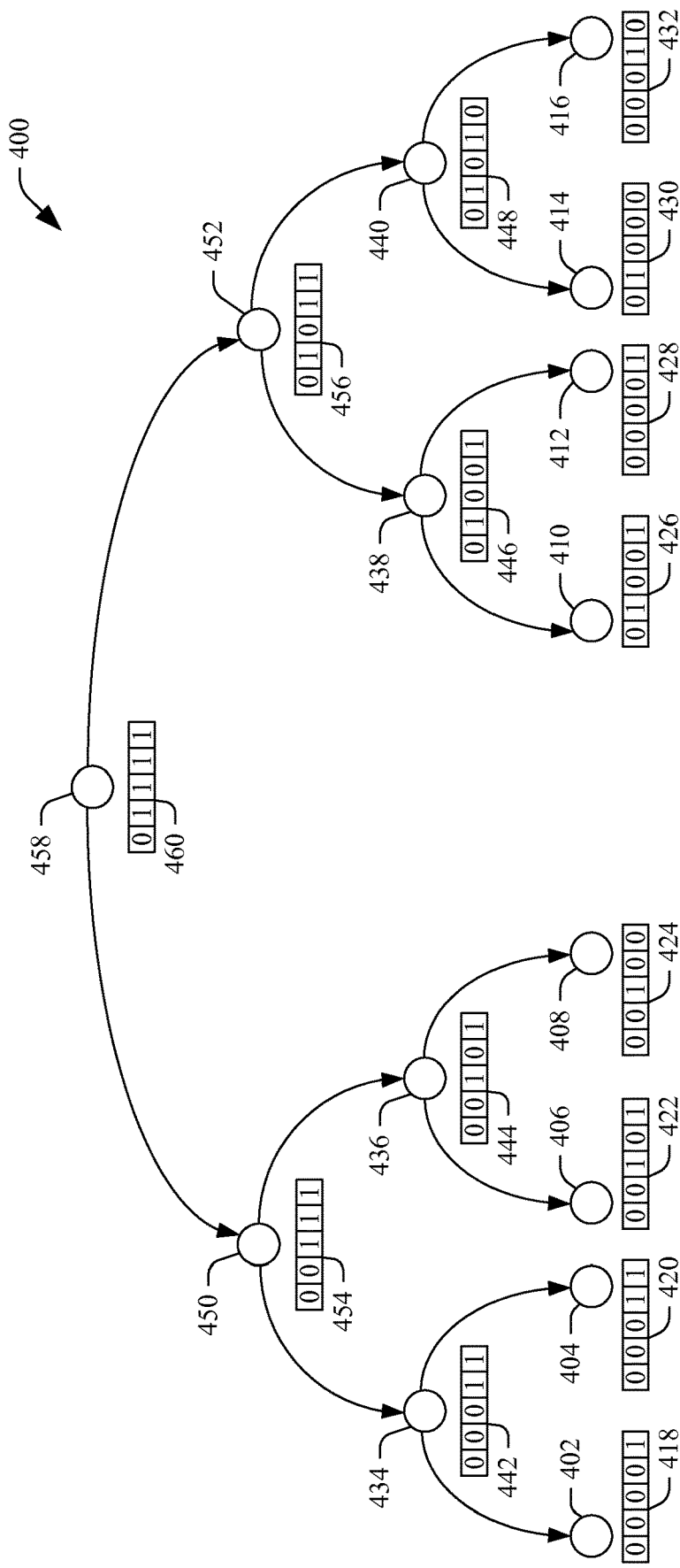
FIG. 4 is an exemplary depiction of an index.

Turning now to FIG. 4, an exemplary index 400 that can be built by the index builder component 404 is illustrated. In this example, the dictionary 110 comprises five keywords; it is to be understood, however, that the dictionary 110 is not limited to a particular number of keywords. Additionally, the index 400 is shown as being a red-black tree; however, as will be understood by one skilled in the art, the tree can be any suitable computer-implemented tree structure.

The tree comprises eight leaf nodes 402-416, which represent pointers to files in the file collection 108. Therefore, the file collection 108, in this example, comprises eight different files. Each of the leaf nodes 402-416 is assigned a vector 418-432, and each vector includes five entries that correspond to the five keywords in the dictionary 110. Thus, in an example, the vector 418 assigned to the leaf node 402 includes a first entry that corresponds to a first keyword in the dictionary 110, a second entry that corresponds to a second keyword in the dictionary 110, and so forth. Values of the entries of the vector 418 indicate whether the file pointed to by the file pointer represented by the leaf node 402 includes the corresponding keyword from the dictionary 110. In an example, if the dictionary 110 includes the keywords "aardvark", "bear", "cat", "dove", and "elephant", then values of entries of the vector 418 indicate whether or not the file pointed to by the leaf node 402 includes such keywords. In the example shown in FIG. 4, the file pointed to by the leaf node 402 includes the keyword "elephant", but does not include the other keywords in the dictionary. Similarly, the file pointed to by the leaf node 402 includes the keywords "dove" and "elephant", but does not include "aardvark", "bear", or "cat" from the dictionary 110.

The tree further comprises a plurality of internal nodes 434-440 and a plurality of vectors 442-448 respectively assigned thereto. Each of the internal nodes is a parent to two leaf nodes. Thus, for instance, the node 434 is a parent node to leaf nodes 402 and 404. Each of the vectors 442-448 has a plurality of entries that correspond to the keywords in the dictionary 110. Values of entries in a vector in the plurality of vectors 442-448 are determined by computing an OR over corresponding entries in the vectors assigned to the leaf nodes 402-418. For instance, the leaf nodes 418 and 420 are children of the intermediate node 434. The vector 442 has values for entries that indicate that at least one of the leaf nodes 418 or 420 points to a file comprises the keywords "dove" and/or "elephant", for example. In another example, the values of the vector 448 indicate that at least one of the leaf nodes 414 or 416 points to a file that includes the keywords "bear" and/or "dove".

The tree can further comprise another set of internal nodes 450-452, wherein the nodes 450-452 are assigned respective vectors 454-456. As before, entries of the vectors 454-456 correspond to keywords in the dictionary 110, and values of such entries indicate whether any leaf nodes beneath such intermediate nodes 450-452 point to files that include keywords represented by the vectors. Therefore, values of the vectors 454-456 are determined by computing an OR over values of the respective vectors 442-448. Accordingly, values of entries in the vector 454 indicate that at least one of the leaf nodes 418-424 points to a file that includes the keyword "cat", at least one of the leaf nodes 418-424 points to a file that includes the keyword "dove", and at least one of the leaf nodes 418-424 points to a file that includes the keyword "elephant". Similarly, values of the vector 456 indicate that at least one of the leaf nodes 426-432 points to a file that includes the keyword "bear", at least one of the leaf nodes 426-432 points to a file that includes the keyword "dove", and at least one of the leaf nodes 426-432 points to a file that includes the keyword "elephant".

The tree further comprises a root node 458 that has a vector 460 corresponding thereto, wherein entries of the vector correspond to keywords in the dictionary 110. Values of the vector 460 of the root node 458 indicate whether any of the leaf nodes 402-416 point to files that include respective keywords of the dictionary 110. The entries of the vector have respective values of 0, 1, 1, 1, and 1. Accordingly, none of leaf nodes 402-416 point to a file that includes the keyword "aardvark", while at least one of the leaf nodes 402-416 points to a file that includes the keyword "bear", at least one of the leaf nodes 402-416 points to a leaf node that points to a file that includes the keyword "cat", at least one of the leaf nodes 402-416 points to a leaf node that points to a file that includes the keyword "dove", and at least one of the leaf nodes points to a file that includes the keyword "elephant". Therefore, it can be understood that each leaf node need not be analyzed to return a set of files that includes the keyword "aardvark"; rather, if the user employed the tree to locate files that include the keyword "aardvark", review of the vector 460 assigned to the root node 458 would indicate that none of the files in the file collection 108 include such keyword. Similarly, if the user issued a query to locate all files that include the keyword "cat", nodes 434, 436, and 402-408 need not be analyzed, as the entry corresponding to the keyword "cat" in the vector 454 assigned to the node 450 indicates that none of the leaf nodes 402-408 points to a file that includes such keyword. As mentioned previously, while the tree is shown as having a binary structure, any suitable tree structure can be employed to represent files in the file collection 108.

Returning again to FIGS. 1 and 2, additional detail pertaining to the encrypter component 116, the token generator component 120, the decrypter component 122, the search component 208, the add component 210, and the delete component 212 will now be provided. As mentioned, the systems 100 and 200 facilitate searchable encryption, which allows the client computing device 102 to encrypt data in such a way that it can later generate search tokens for the remote repository 104. Further, the systems 100 and 200 facilitate dynamic updating of an encrypted index, thereby allowing files to be added or removed from the file collection 108. A dynamic SSE scheme is distributed across the client computing device 102 and the remote repository 104.

For purposes of explanation, a private-key encryption scheme is a set of three polynomial-time algorithms $\epsilon$=(Gen; Enc; Dec), such that Gen($1^k$; r) is a probabilistic algorithm that takes a security parameter k and randomness r and returns a secret key K; Enc(K; p) is a probabilistic algorithm takes a key K and a message p and returns a ciphertext c; and Dec(K; c) is a deterministic algorithm that takes a key K and a ciphertext c and returns p if K was the key under which c was produced.

For purposes of explanation, a private key encryption scheme is a set of the following cryptographic tools: 1) a pseudo-random function (PSR) P: $\{0,1\}^k \times [p] \rightarrow \{0,1\}^k$; 2) a random oracle H: $\{0,1\}^* \times [p] \rightarrow \{0,1\}$ to which an adversary (the remote repository 104) may have access; and 3) a pseudo-random function G:$\{0,1\}^k \times [p] \rightarrow \{0,1\}^k$.

The encrypter component 116 comprises a probabilistic algorithm Gen that receives a security parameter k as input and outputs a secret key K. This can be represented as follows: K←Gen($1^k$). Pursuant to an example, the algorithm Gen can be configured to generate four random k-bit strings $K_1$, $K_2$, $K_3$, and r. The encrypter component 116 can instantiate one private-key semantically secure encryption scheme for encrypting files by calling $K_4$←$\epsilon$.Gen($1^k$; r). The encrypter component 116 may then set K :=($K_1$; $K_2$; $K_3$; $K_4$).

The encrypter component 116 can further comprise a probabilistic algorithm Enc that receives K, the index 112 ($\delta$), and the file collection 108 (f). Such algorithm Enc outputs the encrypted index 204 ($\gamma$) and the ciphertexts 206 (c) for retention at the remote repository 104. This can be represented as follows: ($\gamma$; c)←Enc(K; $\delta$; f). Such an algorithm can act as follows: a private-key can be generated per keyword $w_i$ by calling $\epsilon$.Gen($1^k$; $G_{K_2}(w_i)$) for i=1, . . . , m. This generates a secret key per keyword, e.g., the keys $\epsilon$.$SK_i$ for i=1, . . . , m, where SK is a symmetric key. Thereafter, for 1≤j≤n, $c_j$←$\epsilon$.Enc($K_4$, $f_j$) is employed to output a vector of ciphertexts c. The index builder component 304 builds the index $\delta$ as described above, and the encrypter component 116 can delete the files f while causing the ciphertexts c to be retained in the data store 106 (the identifiers for the files can remain unchanged). For every node v on the tree T that has identifier id(v), the following can be undertaken by the encrypter component 116: 1) two look-up tables of m random entries can be instantiated, $\lambda_{0_v}$ and $\lambda_{1_v}$. A domain of the lookup tables can be $\{0,1\}^k$, whereas the range of the look-up tables is [m]. The encrypter component 116 can then cause $\lambda_{0_v}$ and $\lambda_{1_v}$ to be stored at node v; 2) for every i=1, . . . , m, the encrypter component 116 can set $\lambda_{b_i,v}[P_{K_1}(w_i)]$←$\epsilon_i$.Enc($\epsilon_i$.SK, $data_v[i]$), where $b_i$ is computed as the output of a random oracle, e.g., $b_i$=H($P_{K_3}(w_i)$,id(v)), and where $data_v$ is the vector output by the index builder component 304; 3) for every i=1, . . . , m, the encrypter component 116 can set $\lambda_{\overline{b_i},v}[P_{K_1}(w_i)]$←$\epsilon_i$.Enc($\epsilon_i$.SK, $\overline{data_v[i]}$), where $\overline{b_i}$ is the complement of $b_i$ and $\overline{data_v[i]}$ is the complement of $data_v[i]$; 4) vector $data_v$ is deleted; and 5) $\gamma$:=T and c :=($c_1$, . . . , $c_n$) can be output by the encrypter component 116 and transmitted to the remote repository 104.

Subsequently, the user 118 may wish to perform a search for files encrypted at the remote repository 104. The token generator component 120 can include a (possibly probabilistic) algorithm that takes as input the secret key K and a keyword w (that resides in the dictionary 110) and outputs a search token $\tau_s$. This algorithm can be represented as follows: $\tau_s$←SrchToken(K, w). The algorithm can call $\epsilon_i$.Gen ($1^k$; $G_{K_2}(w)$), and can output $\tau_s$:=($P_{K_1}(w_i)$,$P_{K_3}(w_i)$, $\epsilon_i$.SK).

The search component 208 comprises a deterministic algorithm that receives the search token 96 $_s$, the ciphertexts c, and the encrypted index $\gamma$, and outputs a sequence of ciphertexts $c_w$ (ciphertexts that correspond to files that include the keyword w). Such an algorithm can be represented as follows: $c_w$:=Search($\gamma$, c, $\tau_s$). The algorithm can execute by first parsing $\tau_s$ as ($\tau_1$, $\tau_2$, $\tau_3$). An algorithm referred to herein as search(root(T)) can be called, wherein T is the red-black tree included in the encrypted index $\gamma$. v and z can be left and right children of a node u, respectively. The algorithm search(u) can be recursively defined as follows: 1) a bit b=H($\tau_2$, id(u)) can be output, and a=$\epsilon_i$. Dec($\tau_3$, $\lambda_{b,u}[\tau_1]$) can be computed; 2) if a=0, a null is returned; 3) if u is a leaf, then $c_w$:=$c_w \cup c_u$, where $c_v$ is the ciphertext corresponding to id(u). Otherwise, search(v) and search (z) can be called.

The decrypter component 122 comprises a deterministic algorithm Dec(K, c) that takes as input the secret key K and a ciphertext c (output by the search component 208) and outputs an unencrypted file f that includes the keyword w. This can be expressed formally as follows: $f_i$:=$\epsilon$. Dec($K_4$, $c_i$).

As mentioned above, the token generator component 120 can generate an add token responsive to an indication that a file f has been added to the file collection 108. The client computing device 102 transmits a message to the remote repository 104 to indicate that an add token is desirably generated. The remote repository 104 can respond to the message with a receipt r, which can be a subtree (described below). The token generator component 120 can comprise a (possibly probabilistic) algorithm $\tau_a$←AddToken(K, f, r), which receives the secret key K, the file f that is added, and the receipt r as input and outputs an add token $\tau_a$. This algorithm can operate as follows: an encryption of the added file can be computed: $C \leftarrow \epsilon.Enc(K_4, f)$. The receipt r can be a certain subtree T* that is related to the portion of a red-black tree T that is accessed during an (structural) update. If T' is the updated version of T, and T* is a subtree of T', then T* can be defined as follows: the subtree T* comprises all nodes v of T' that have at least one descendent (e.g., at least one node in their subtree) that has changed its structure after the update (e.g., by obtaining a new node as a new child or whole substree as a new child). For every node v of the subtree T* that has an identifier that indicates it belongs to subtree T*, the algorithm AddToken can perform the following actions: 1) instantiate two vectors of m random entries, $\lambda_{0_v}$ and $\lambda_{1_v}$, which are stored at node v; 2) for every i=1, ..., m, encrypted vectors $k_v[i]$ are updated by setting $\lambda_{b,v}[P_{K_1}(w_i)] \leftarrow \epsilon_i . Enc(\epsilon_i.SK, k_v[i])$, where b is a bit computed as the output of a random oracle, e.g., b=H $(P_{K_3}(w_i), id(v))$ and $k_v$ is the updated vector due to the addition of file f; 3) output $\tau_a := (\{(id(v), \lambda_{0_v}, \lambda_{1_v}): v \in T'^{(q)}\}, c, id(f)) = (\tau_1, \tau_2, \tau_3)$.

The add component 210 on the remote repository 104 receives the add token $\tau_a$. The add component 210 can include the deterministic algorithm $(\gamma', c') := Add (\gamma, c, \tau_a)$ which takes as input the encrypted index $\gamma$, the sequence of ciphertexts c, and the add token $\tau_a$ generated by the token generator component 120, and outputs a new encrypted index $\gamma'$ and a new sequence of ciphertexts c'. This algorithm can parse $\tau_a$ as $(\tau_1, \tau_2, \tau_3)$. Using $\tau_3$, a structural update can be undertaken on the tree T (on the encrypted index $\gamma$), and a new tree T' is output. Using $\tau_1$, updated encryption information is copied on the new tree T'. $\gamma'$ is then output to be the new encrypted index containing T', and c' to be the new set of ciphertexts that include c.

The token generator component 120 can also be configured to generate a delete token by way of $\tau_d \leftarrow DelToken(K, f)$, which is a (possibly probabilistic) algorithm that takes as input the secret key K and a file f and outputs a delete token $\tau_d$. This algorithm can operate the same as AddToken, with the difference that in this the delete token can be defined as $\tau_d := (\{(id(v), \lambda_{0_v}, \lambda_{1_v}): v \in T'^{(q)}\}, id(f)) = (\tau_1, \tau_2)$. This delete token can be transmitted to the remote repository 104.

The delete component 212 on the remote repository 104 receives the delete token $\tau_d$. The add component 210 can include the deterministic algorithm $(\gamma', c') := Del(\gamma, c, \tau_d)$, which takes as input the encrypted index $\gamma$, the sequence of ciphertexts c, and the delete token $\gamma_d$ generated by the token generator component 120, and outputs a new encrypted index $\gamma'$ and a new sequence of ciphertexts c'. This algorithm can parse $\tau_d$ as $(\tau_1, \tau_2)$. Using $\tau_2$, a structural update can be undertaken on the tree T, and a new tree T' is output. Using $\tau_1$, updated encryption information is copied on the new tree T'. $\gamma'$ is then output to be the new encrypted index containing T', and c' to be the new set of ciphertexts that comprises c−{c}, where c is the ciphertext of a file f with $id(f)=\tau_2$.

Figure 5:
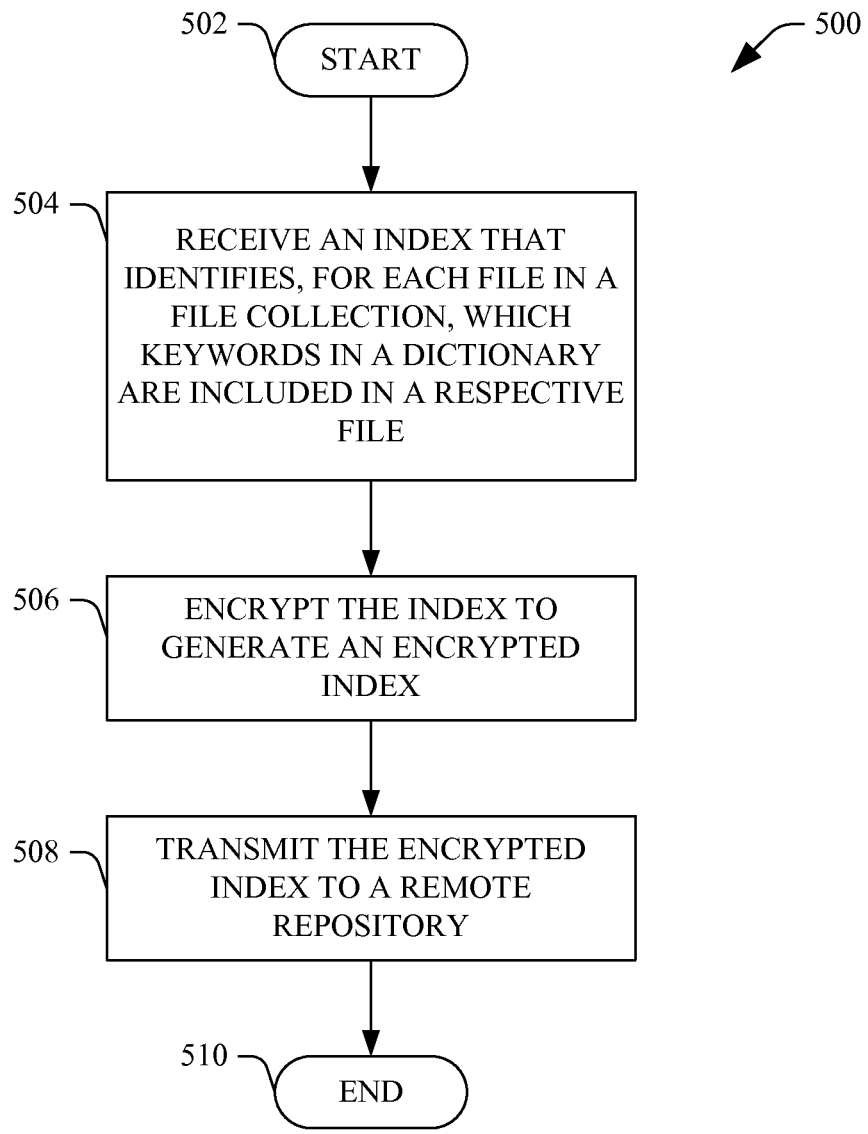
FIG. 5 is a flow diagram that illustrates an exemplary methodology for generating an encrypted index that can be employed in connection with searching over encrypted files.
Figure 6:
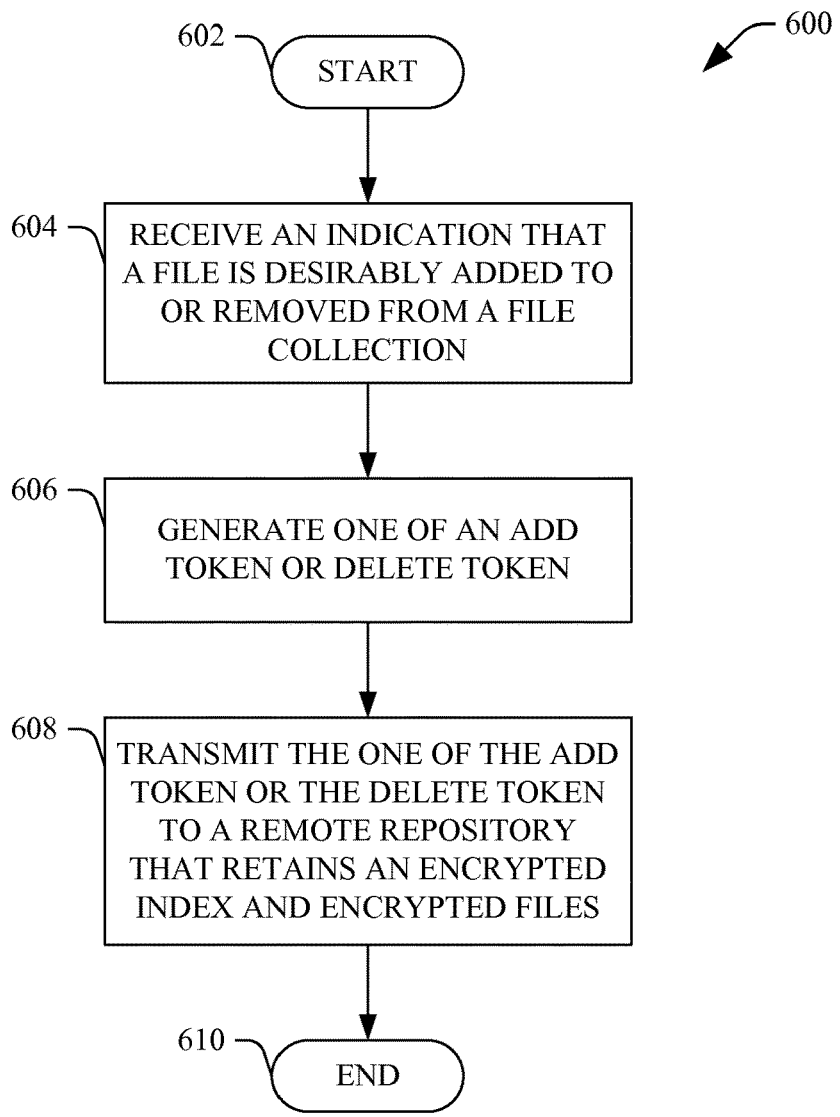
FIG. 6 is a flow diagram that illustrates an exemplary methodology for updating an encrypted index that can be employed in connection with searching over encrypted files.
Figure 7:
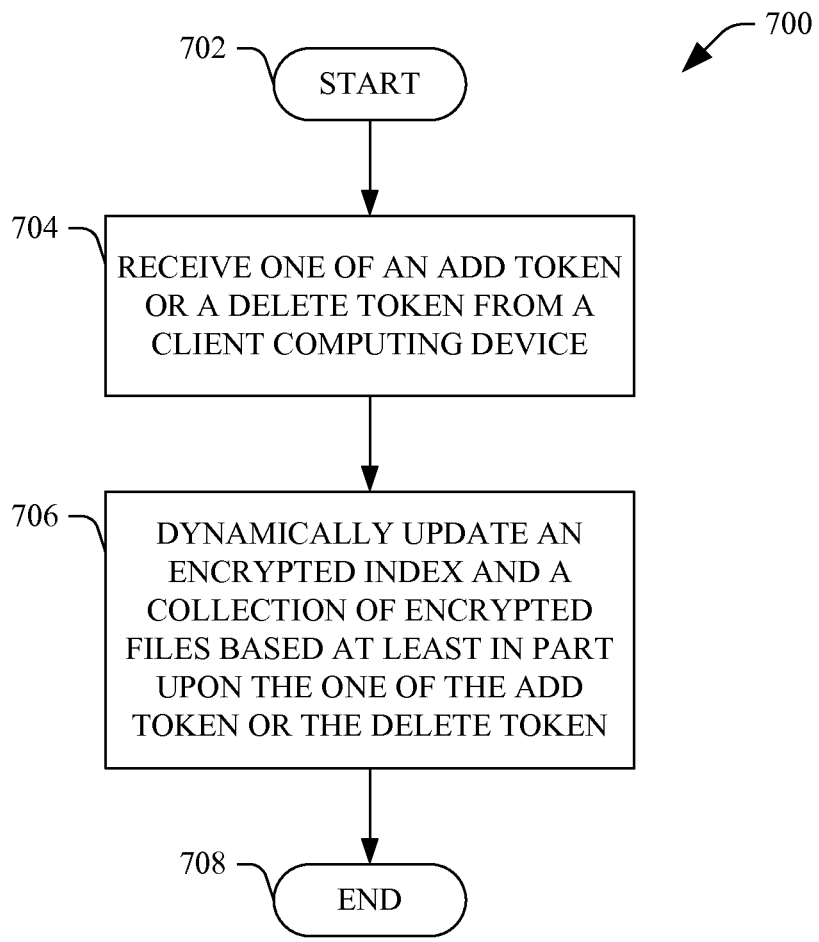
FIG. 7 is a flow diagram that illustrates an exemplary methodology for updating an encrypted index that can be employed in connection with searching over encrypted files.

With reference now to FIGS. 5-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Referring now to FIG. 5, an exemplary methodology 500 that facilitates generating an index that indicates which keywords are included in files in a file collection is illustrated. The methodology 500 starts at 502, and at 504 an index is received that identifies, for each file in a file collection, which keywords in a dictionary are included in a respective file. For instance, the index can be a red-black tree, and can have a structure that has been described in detail above.

At 506, the index is encrypted to generate an encrypted index. The unencrypted index may have, for instance, a structure that is similar to the tree structure shown in FIG. 4, such that each node in the tree is assigned a vector with numerous entries that correspond to keywords in a dictionary. The index can be encrypted by first computing a compliment for each of the vectors. Thereafter, for each corresponding entry in the vectors, a random oracle can be employed to selectively ascertain which vector includes a "correct" entry by randomly or pseudorandomly outputting a "1" or "0". Additionally, a start position of the vectors can be randomly selected, such that for a first node, the first entry in a vector corresponds to an Nth keyword in the dictionary, while for a second node, the first entry in a vector corresponds to an Mth keyword in the dictionary. Accordingly, an adversary reviewing vectors assigned to any given node in the encrypted index would be unable to ascertain which value between two vectors is correct, and further would be unable to ascertain which keyword corresponded to a given entry of the two vectors. At 508, the encrypted index is transmitted to a remote repository, wherein the encrypted index points to encrypted files on such remote repository. The methodology 500 completes at 510.

Now referring to FIG. 6, an exemplary methodology 600 for transmitting one of an add token or a delete token to a remote repository to update an encrypted index is illustrated. The methodology 600 starts at 602, and at 604 an indication is received that a file is desirably added or removed from a file collection. For instance, a user can receive an email that is desirably included in an email collection or delete an email from an email collection. At 606, one of an add token or a delete token is generated responsive to receive of the aforementioned indication. The add token can include an encrypted file c that is desirably added to a file collection, a plurality of vectors that can be indicative of which keywords in a dictionary are included in the file (and not included in the file). The delete token can include data that identifies a position in an encrypted index that points to an encrypted file c that corresponds to a file that is desirably deleted from a file collection. At 608, the one of the add token or the delete token is transmitted to a remote repository that is tasked with retaining encrypted files of the user and an encrypted index corresponding to such files. The methodology 600 completes at 610.

With reference now to FIG. 7, an exemplary methodology 700 that facilitates dynamically updating an encrypted index that can be utilized in connection with searching over encrypted files is illustrated. The methodology 700 starts at 702, and at 704 one of an add token or a delete token is received from a client computing device. At 704, an encrypted index and a collection of encrypted files are dynamically updated at a remote repository based at least in part upon the add token or the delete token. As discussed above, the add token can include an encrypted file and vectors that are indicative of which keywords are (or are not) included in the file. The add token can also include a subtree of an index, wherein nodes of the subtree are assigned vectors with values for entries that are based upon values for the vectors corresponding to the encrypted file. The encrypted index can have a corresponding tree structure, and a subtree on the encrypted tree can be dynamically updated. The delete token can include a subtree with vectors assigned to nodes therein, wherein entries in the vectors are updated to reflect the deletion of the file from the file collection. The corresponding subtree in the encrypted tree can be updated based upon the delete token. The methodology 700 completes at 708.

Figure 8:
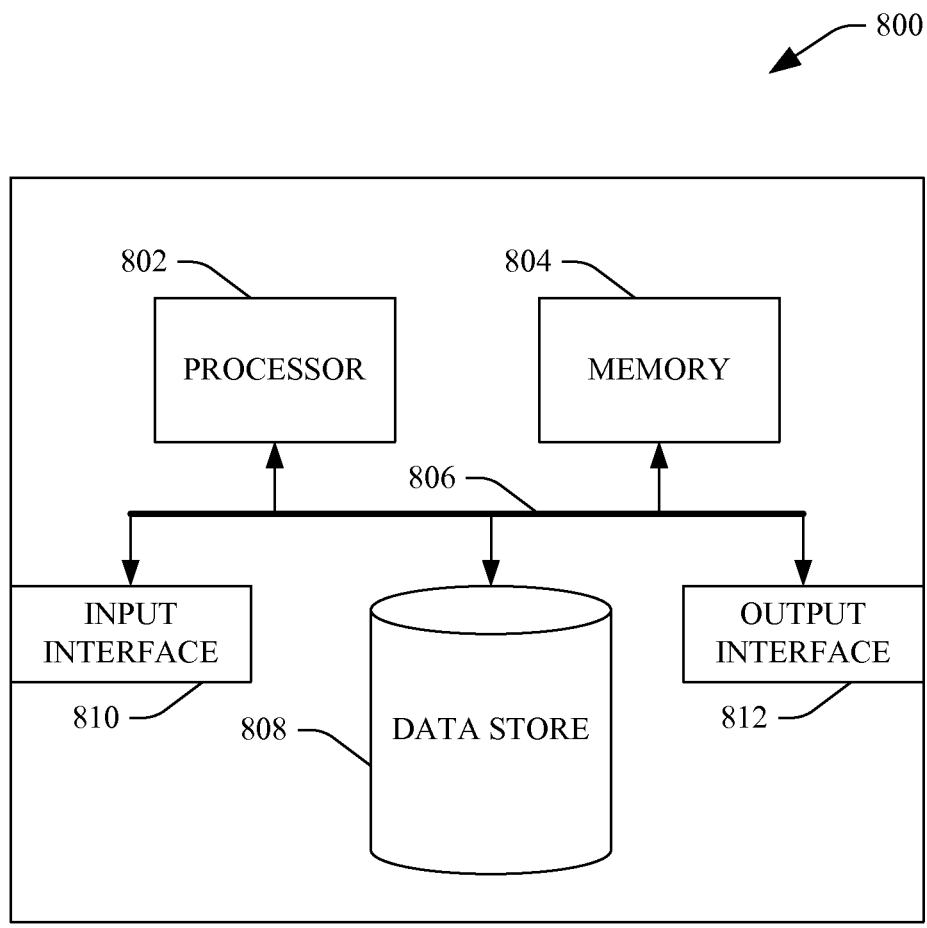
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports dynamically updating an encrypted index to facilitate searching over encrypted files. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store a file collection, a secret key, an index, encrypted files, an encrypted index, or the like.

The computing device 800 additionally includes a data store 808 that is accessible by the processor 802 by way of the system bus 806. The data store may be or include any suitable computer-readable storage, including a hard disk, memory, etc. The data store 808 may include executable instructions, a file collection, an index, encrypted files, an encrypted index, etc. The computing device 800 also includes an input interface 810 that allows external devices to communicate with the computing device 800. For instance, the input interface 810 may be used to receive instructions from an external computer device, a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed at a server computing device, the method comprising:
   storing ciphertexts in a data repository, the ciphertexts being encryptions of files;
   storing an encrypted index in the data repository of the server computing device, the encrypted index being an encryption of an index that indexes the files by words included in the files, wherein an entirety of the index is encrypted using an encryption key to generate the encrypted index;
   receiving, from a client computing device, a new ciphertext that is to be added to the ciphertexts, the new ciphertext being an encryption of a new file; and
   updating the encrypted index to reflect addition of the new ciphertext to the ciphertexts, wherein updating of the encrypted index is performed without decrypting the encrypted index to acquire the index.

2. The method of claim 1, wherein the encrypted index has a tree structure.

3. The method of claim 2, wherein the tree structure is a red black tree.

4. The method of claim 1, further comprising:
   receiving a search token from the client computing device, the search token comprising an encryption of a keyword that is included in the file;
   searching the encrypted index based upon the search token;
   identifying the new ciphertext based upon the searching of the encrypted index; and
   transmitting the new ciphertext to the client computing device.

5. The method of claim 1, the ciphertexts being encrypted emails.

6. The method of claim 1, the ciphertexts being encrypted images.

7. The method of claim 1, further comprising:
   receiving, from the client computing device, an add token, the add token comprises an update to the encrypted index, wherein updating the encrypted index to reflect addition of the new ciphertext to the ciphertexts comprises updating the encrypted index to include the update in the add token.

8. The method of claim 1, further comprising:
   receiving a delete token from the client computing device, the delete token comprises an update to the encrypted index that reflects deletion of a ciphertext from the ciphertexts; and
   responsive to receiving the delete token, updating the encrypted index based upon the delete token to reflect deletion of the ciphertext from the ciphertexts, wherein updating of the encrypted index to reflect deletion of the ciphertext is performed without decrypting the encrypted index.

9. The method of claim 1, the ciphertext is encrypted based upon the encryption key, and wherein the encryption key is inaccessible to the server computing device.

10. A server computing device that is in network communication with a client computing device, the server computing device comprises:
    computer-readable storage that comprises:
      ciphertexts, the ciphertexts are encryptions of files; and
      an encrypted index, the encrypted index being an encryption of an index that indexes the files by keywords included in the files, wherein an entirety of the index is encrypted based upon an encryption key to form the encrypted index;

a processor; and memory that comprises instructions that, when executed by the processor, cause the processor to perform acts comprising:

responsive to receipt of a request from the client computing device to add a ciphertext to the ciphertexts in the computer-readable storage, updating the encrypted index to reflect addition of the ciphertext to the ciphertexts, the ciphertext being an encryption of a file, wherein updating the encrypted index is performed without acquiring the index;

subsequent to the encrypted index being updated, searching the encrypted index based upon a search token received from the client computing device, the search token comprising an encryption of a keyword that is included in the file;

identifying the ciphertext based upon the searching of the encrypted index; and transmitting the ciphertext to the client computing device based upon the searching of the encrypted index.

11. The server computing device of claim 10, the encrypted index having a tree structure.

12. The server computing device of claim 11, the tree structure being a binary tree structure.

13. The server computing device of claim 11, the tree structure being a tertiary tree structure.

14. The server computing device of claim 10, the searching of the encrypted index based upon the search token performed without decrypting the encrypted index to acquire the index, and further without decrypting the encryption of the keyword in the search token.

15. The server computing device of claim 10, the ciphertexts being encryptions of images.

16. The server computing device of claim 10, the ciphertexts being encryptions of messages.

17. The server computing device of claim 10, the acts further comprising:

responsive to receipt of a request from the client computing device to delete a second ciphertext from the ciphertexts in the computer-readable storage, updating the encrypted index to reflect deletion of the second ciphertext from the ciphertexts, the second ciphertext being an encryption of a second file, wherein updating the encrypted index to reflect deletion of the second ciphertext is performed without acquiring the index;

subsequent to the encrypted index being updated to reflect deletion of the second ciphertext, searching the encrypted index based upon a second search token received from the client computing device, the second search token comprising an encryption of a second keyword that is included in the second file; and failing to identify the second ciphertext in the ciphertexts when searching the encrypted index.

18. The server computing device of claim 10, the request to add the ciphertext to the ciphertexts comprises an add token, the add token comprises an encrypted portion of the index that is to be updated, the acts further comprising updating the encrypted index based upon the encrypted portion of the index included in the add token.

19. The server computing device of claim 10, the ciphertexts ordered in a sequence, and wherein updating of the encrypted index to reflect addition of the ciphertext to the ciphertexts is based upon the sequence.

20. A server computing device comprising a computer-readable medium, the computer-readable medium comprises instructions that, when executed by a processor, cause the processor to perform acts comprising:

receiving ciphertexts from a client computing device, the ciphertexts being encryptions of files;

receiving an encrypted index from the client computing device, wherein the encrypted index is an encryption of an index that indexes the files by keywords included in the files, an entirety of the encrypted index generated based upon a key that is inaccessible to the server computing device;

subsequent to receiving the cyphertexts and the encrypted index, receiving, from the client computing device, a new ciphertext that is to be added to the ciphertexts, the new ciphertext being an encryption of a new file; and updating the encrypted index to reflect addition of the new ciphertext to the ciphertexts, wherein updating of the encrypted index is performed without decrypting the encrypted index to acquire the index.

* * * * *